United States Patent

Hoffmann et al.

[11] Patent Number: 5,496,066
[45] Date of Patent: Mar. 5, 1996

[54] SAFETY DEVICE FOR THE PASSENGER COMPARTMENT OF A MOTOR VEHICLE BODY

[75] Inventors: Rainer Hoffmann, Alzenau; Michael Bischoff, Karlstein; Joachim Franz, Waldaschaff; Thomas Thein, Sennfeld, all of Germany

[73] Assignee: Pars - Passive Ruckhaltesysteme GmbH, Alzenau, Germany

[21] Appl. No.: 293,000

[22] Filed: Aug. 19, 1994

[30] Foreign Application Priority Data

Aug. 24, 1993 [DE] Germany .................. 43 28 446.9

[51] Int. Cl.⁶ .................................................. B60R 21/04
[52] U.S. Cl. ................................................... 280/753
[58] Field of Search ................................... 280/748, 751, 280/752, 753; 180/90; 267/50, 37.4, 49

[56] References Cited

U.S. PATENT DOCUMENTS

| 2,855,216 | 10/1958 | Sacks | 280/753 |
| 3,159,389 | 12/1964 | Clary | 267/49 |
| 3,814,459 | 6/1974 | Eckels | 280/753 |
| 3,837,670 | 9/1974 | Hilyard | 280/753 |
| 4,023,643 | 5/1977 | Bagley, Jr. | 280/753 |
| 4,951,963 | 8/1990 | Behr et al. | 280/753 |
| 5,131,681 | 7/1992 | Wetzel et al. | 280/753 |

FOREIGN PATENT DOCUMENTS

| 0061828 | 10/1985 | European Pat. Off. . |
| 0421572 | 4/1991 | European Pat. Off. . |
| 2634222 | 2/1978 | Germany . |
| 3908713 | 10/1989 | Germany . |
| 4002448 | 8/1990 | Germany . |
| 4007524 | 5/1991 | Germany . |
| 4021145 | 11/1991 | Germany . |
| 4201824 | 8/1992 | Germany . |

Primary Examiner—Margaret A. Focarino
Assistant Examiner—Paul N. Dickson
Attorney, Agent, or Firm—Sprung Horn Kramer & Woods

[57] ABSTRACT

A safety device for the passenger compartment of a passenger car comprises a cushion plate, which is mounted in the front part of the vehicle on the knee level and is displaceable by drive means toward the knees of the passenger. In a simple embodiment the drive means comprise a fixed leaf spring, which is prestressed in a state of rest and is releasable to move opposite to the direction of travel of the vehicle.

14 Claims, 3 Drawing Sheets

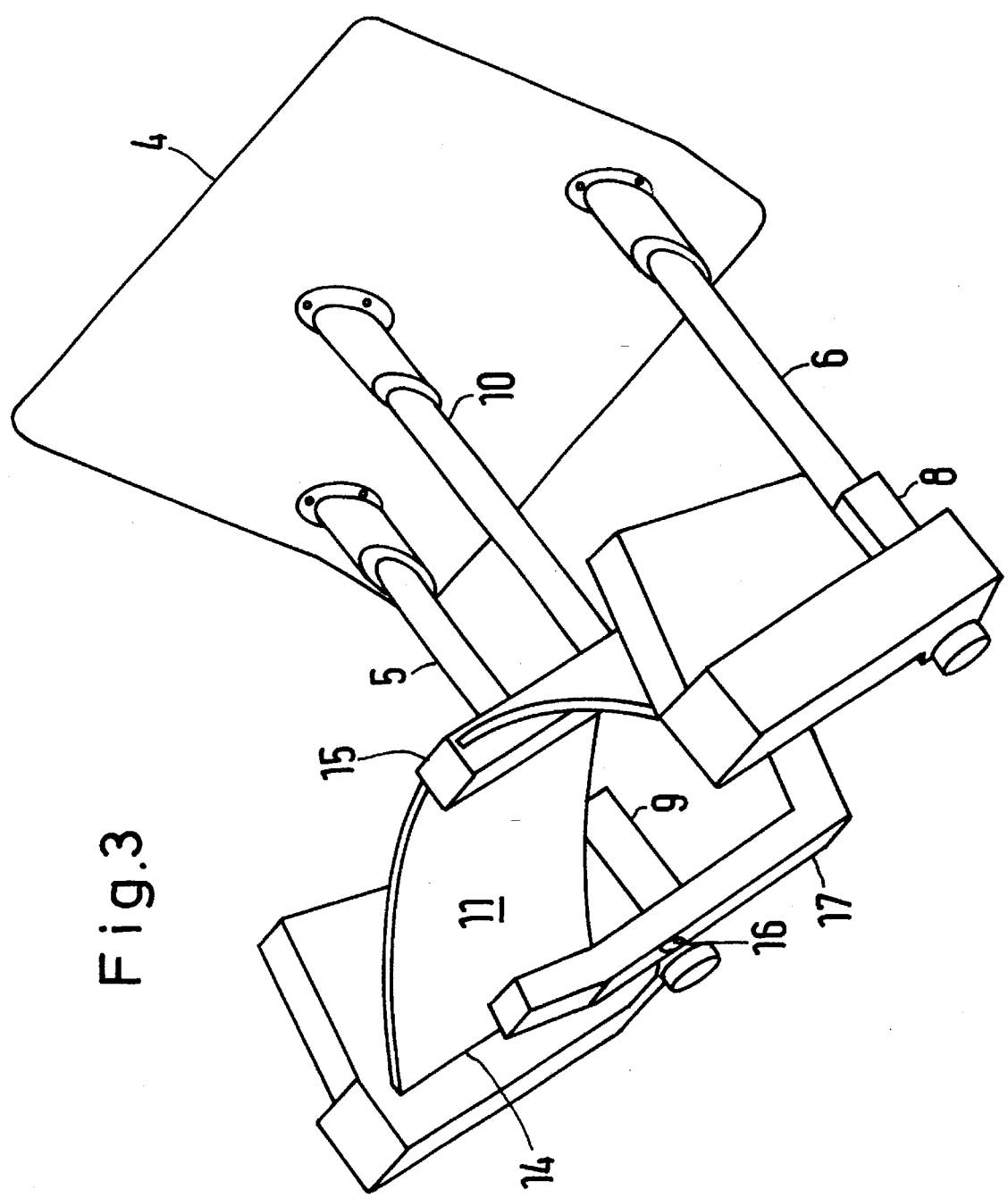

SAFETY DEVICE FOR THE PASSENGER COMPARTMENT OF A MOTOR VEHICLE BODY

DESCRIPTION

This invention relates to a safety device for the passenger compartment of a motor vehicle body, preferably a passenger car body, which device consists of a cushion plate, which is disposed on the knee level in front of a passenger seated on a seat of the vehicle, preferably a seat for a front passenger, and is integrated in the front part of the passenger compartment and secured to a guide and in response to an impact is movable by (rive means toward the knees of the passenger.

1. Background of the Invention

In order to increase the safety standard of passive restraining systems for the passenger compartment particularly of passenger car bodies, which restraining systems ensure that after an impact the passenger will take part in the deceleration of the vehicle as soon as possible and will not be thrown against the boundary of the passenger cell as a result of the impact, it is contemplated to incorporate in the front boundary of the passenger cell a knee cushion made of a plastically deformable material. In case of an impact such a knee cushion is intended to prevent a displacement of the legs and pelvis of the passenger, particularly when he or she is not restrained by a three-point seat belt. This is accomplished in that the knee cushion is moved toward the knees of the passenger and is close to the knees within 20 to 30 milliseconds after the impact. If such a knee cushion is provided in combination with a gas bag unit for protection in case of an impact, the gas bag of which emerges into the passenger compartment when the knee cushion is thus actuated, the risks of an injury to the head, cervical vertebra, chest, and internal organs will be reduced as well as the risk of an injury to the legs of the passenger.

2. Description of Prior Art

DE-A-4,201,824 and DE-A-2,634,222 disclose systems for restraining the legs of a passenger who is seated on a front passenger seat. In response to an impact of the motor vehicle said restraining systems cause an impact-cushioning element, which is movable about a horizontal axis, to perform a pivotal movement to a position in front of the knees of the passenger. DE-A-3,908,713, DE-C-4,007,524, and EP-B-O,061,828 disclose that a gas bag device for protection in case to an impact is provided in the lower portion of the front part of the motor vehicle and in response to an impact said device causes the inflating gas bag to move between the front part and the knees of the passenger so that the legs of the passenger cannot be displaced forwardly opposite to the direction of the impact.

DE-A-4,002,448, DE-C-4,021,145, and EP-A-0,421,572 describe systems for restaining the legs of the passenger. Said systems comprise a knee cushion, which is integrated in the front part of the vehicle on the level of the knees of the passenger and in response to an impact is moved by a servodrive and a guide to a position close to the knees so that the passenger will take part in the deceleration of the vehicle as soon as possible. It is contemplated to use such restraining systems particularly in cooperation with a gas bag unit for protection in case of an impact, which unit is incorporated in the Front part of the motor vehicle and comprises a gas bag, which moves to a position between the passenger and the front part.

It is an object of the invention so to design the safety device described first hereinbefore that the cushion plate can be moved by relatively simple parts to a position which is close to the knees so that the path length which is available for the forward displacement of the legs of the passenger will be as small as possible.

BRIEF DESCRIPTION OF INVENTION

That abject is accomplished in that the drive means for the cushion plate consist of a leaf spring, which is connected to the cushion plate and is fixed in the vehicle and is prestressed in a state of rest and is releasable to move opposite to the direction of travel of the vehicle. In response to an impact of the vehicle the initial stress of the leaf spring will be released so that the cushion plate will be displaced toward the knees of the passenger. In that case the legs of the passenger will take part in the deceleration of the vehicle rather soon and as the overall result the loads will be reduced so that the risk of an injury to the legs will considerably be decreased.

The leaf spring is made of spring steel or of a plastic that is reinforced by glass fibers or carbon fibers and when it is prestressed in its position of rest the leaf spring will be straight or elliptical or parabolic.

In dependence on the spring force which is required to push out the cushion plate the leaf spring may comprise one or more piles and may preferably comprise low-friction inserts between adjacent plies.

In a preferred embodiment of the safety device the leaf spring which is prestressed in its state of rest is fixed at both ends and is connected to the cushion plate by a push rod, which is secured to the highly stressed portion of the spring.

Alternatively, the prestressed leaf spring may be fixed only at its center and with its end portions may be connected to the guide for the cushion plate, which guide will then be used as a push rod for displacing the cushion plate.

Alternatively, the prestressed leaf spring may be fixed only at one end and in that case the guide for the cushion plate may be connected to the free end portion of the spring and may serve as a push rod for displacing the cushion plate.

The leaf spring may be installed to extend in a horizontal or vertical direction so that an adaptation to the space which is available behind the front part of the vehicle will be permitted.

To hold the prestressed leaf spring in its state of rest, the leaf spring is fixed by a severable screw to a holder, which is fixed to the vehicle. The detonator for the solid propellant for severing the severable screw is connected to a conventional impact sensor, which is mounted in the vehicle, so that the connection between the holder, which is fixed to the vehicle, and the prestressed leaf spring will be destroyed by the destruction of the severable screw within about 10 to 12 milliseconds after the impact and the leaf spring will displace the cushion plate to a position in front of the knees of the passenger within further 10 to 12 milliseconds.

Instead of a severable screw, an electromagnet may be used to hold the leaf spring prestressed in its position of rest and in response to an impact the impact sensor will initiate the flow of an electric current which causes the electromagnet to release the leaf spring for a movement toward the knees of the passenger.

The leaf springs may consist of rectangular or triangular or trapezoidal or semielliptic springs.

To prevent the leaf spring from swinging through after it has been released from its intial stress, the leaf spring is connected to the push rod or guide by a plug-and-socket joint.

The guide for the cushion plate is mounted to be displaceable horizontally or in an oblique rearward and upward direction.

In a special embodiment of the safety device, a stop ring is mounted on the guide for the cushion plate and arranged to brake the displacement of the cushion plate opposite to the direction of travel when the plate is close to the knees.

DRAWINGS

This invention is illustrated more in detail and by way of example in the drawing, in which FIG. 1 is a schematic side elevation showing the portion of a passenger car adjacent to the seat for the front passenger, with a cushion plate, which has been extended on the level of the knees of a passenger who is seated on the seat for the front passenger, FIG. 2 is a perspective view showing the safety device in a state of rest, FIG. 3 is a perspective view showing the safety device in its activated state, FIG. 4 is a schematic side elevation of an alternative mounting of the guide of FIG. 1, and FIG. 5 is a schematic perspective view of an alternative leaf spring for that of FIG. 3.

DETAILED DESCRIPTION OF THE INVENTION

Figure 1:
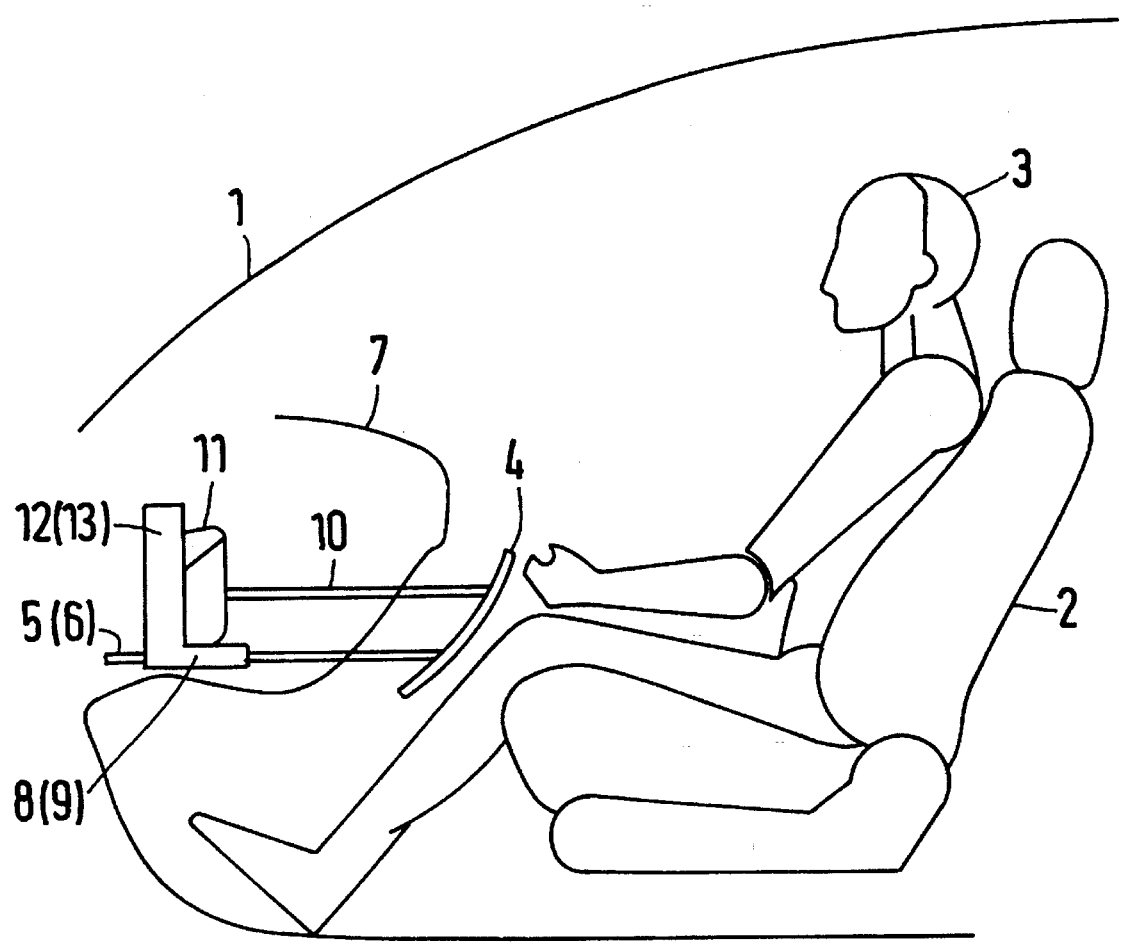
Figure 2:
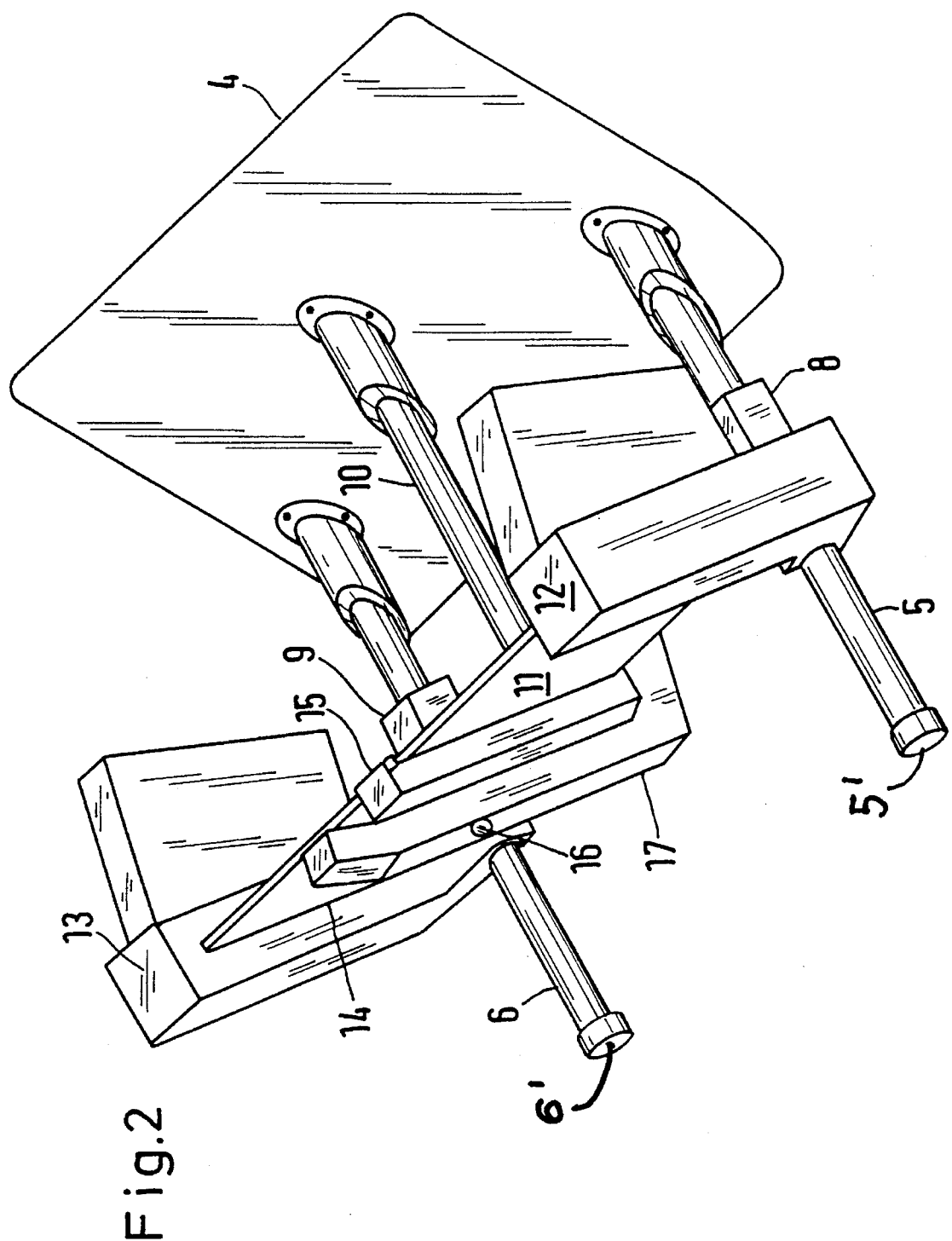

The front part 1 of the passenger compartment of a passenger car is indicated by its contour and comprises a seat 2 for a front passenger 3, who is seated on said seat and has not applied a seat belt. The safety device comprises a hard cushion plate 4, which is covered by a plastically deformable plastic layer and on its front side is secured to two cylindrical sliding guides 5, 6, which are displaceable in the longitudinal direction of the vehicle. In its state of rest the cushion plate 4 is integrated in the front part 7 of the vehicle. Each of the sliding guides 5, 6 is movably mounted in a guide housing 8 or 9, which is fixed to the vehicle. A stop ring 5', 6', is secured to each sliding guide 5, 6 to brake the displacement of the cushion plate 4 from its state of rest opposite to the direction of travel of the passenger car when the cushion plate is close to the knees of the passenger 3. The front side of the cushion plate 4 is connected by a push rod 10 to the central portion of a rectangular leaf spring 11, which is prestressed in a straight shape. The rectangular leaf spring 11 is fixed at both ends in slots 14 of holders 12, 13, which are fixed to the vehicle and connected to the guide housings 8, 9. In its state of rest the prestressed rectangular leaf spring 11 is connected by a holder 15, which is secured to the leaf spring, and a member 16 which may be a severable screw or electromagnet to the holding arm 17, which is fixed to the vehicle. The severable screw 16 comprises a solid propellant, which is adapted to be detonated by an electric detonator, which is responsive to an impact sensor provided in the vehicle. In response to its detonation, the solid propellant destroys the severable screw 16 so that the rectangular leaf spring 11 moves opposite to the direction of travel of the vehicle and within a part of a second moves the cushion plate 4 toward the knees of the passenger 3. In response to the impact the holder 15 of the rectangular leaf spring 11 is separated from the holding arm 17 and the rectangular leaf spring 11 is bent by its spring force opposite to the direction of travel of the vehicle to assume a parabolic shape within about 12 milliseconds.

Within further 12 milliseconds the cushion plate 4 is moved toward the knees of the passenger 3. As a result, the risk of an injury to the passenger 3 in the space provided for his or her feet is greatly reduced. The cushion plate 4 causes the passenger 3 to take place in the deceleration of the passenger car as soon as possible so that the risk of injuries to the legs will greatly be reduced.

FIG. 4 schematically shows an alternative mounting of the guide of FIG. 1. Guide housings 8a, 9a incline upwardly from holders 12a, 13a so that push rods 10a also incline upwardly.

In FIG. 5, in contrast to FIG. 1 the curved spring 11a is made up of more than a single ply, viz. plies 11b and 11e.

We claim:

1. A safety device for the passenger compartment of a motor vehicle, which device consists of a cushion plate (4), which is disposed at knee level in front of a passenger (3) seated in a seat (2) of the vehicle, the cushion plate is integrated in the front part of the passenger compartment and is secured to a guide (5, 6) and in response to an impact is movable by drive means toward the knees of the passenger, the drive means including a leaf spring (11) which is connected to the cushion plate (4) and is fixed in the vehicle and is prestressed in a state of rest and is releasable to move opposite to the direction of travel of the vehicle.

2. A safety device according to claim 1, characterized in that the leaf spring (11) has a straight shape when it is prestressed in its state of rest.

3. A safety device according to claim 1, characterized in that the leaf spring (11) consists of spring steel or of plastic which is reinforced by glass fibers or carbon fibers.

4. A safety device according to claim 1, characterized in that the leaf spring (1) is a single ply leaf spring.

5. A safety device according to claim 1, characterized in that the leaf spring is a multi-ply leaf spring (11), which comprises low-friction interlayers.

6. A safety device according to claim 1, characterized in that the leaf spring (11) has two ends which are in fixed position relative to the vehicle body, which spring is connected to the cushion plate (4) by a push rod (10), which is attached to the prestressed leaf spring.

7. A safety device according to claim 1, characterized in that the leaf spring (11) is fixed at its center relative to the vehicle body, wherein the guide comprises two guides (5,6) which are secured to respective end portions of the leaf spring.

8. A safety device according to claim 1, characterized in that the leaf spring (11) extends vertically.

9. A safety device according to claim 1, characterized in that the leaf spring (11) in its prestressed resting state is fixed by a severable screw (16) to a holder (17), which is fixed to the vehicle.

10. A safety device according to claim 1, characterized in that the leaf spring (11) in its prestressed resting state is held by an electromagnet which is fixed to the vehicle.

11. A safety device according to claim 1, characterized in that the leaf spring (11) consists of a rectangular spring.

12. A safety device according to claim 1, characterized in that the leaf spring (11) is connected to the guide (5, 6) by a plug-and-socket joint.

13. A safety device according to claim 1, characterized in that a stop ring is secured to the guide (5, 6) of the cushion plate (4).

14. A safety device according to claim 1, characterized in that the guide (5, 6) for the cushion plate (4) is mounted to be movable horizontally or in an oblique rearward and upward direction.

* * * * *